US006346579B1

(12) United States Patent
Zanzig et al.

(10) Patent No.: US 6,346,579 B1
(45) Date of Patent: Feb. 12, 2002

(54) PNEUMATIC TIRE HAVING A TREAD COMPOUND DERIVED FROM LATEX BLEND

(75) Inventors: David John Zanzig, Uniontown; Paul Harry Sandstrom, Tallmadge, both of OH (US); Joseph Walter Miller, Houston, TX (US); Richard Robinson Smith, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1131 days.

(21) Appl. No.: 08/692,325

(22) Filed: Aug. 5, 1996

Related U.S. Application Data

(63) Continuation of application No. 08/518,449, filed on Aug. 23, 1995, now abandoned.

(51) Int. Cl.[7] .......................... C08L 9/00; C08F 236/00; C08J 3/02; C08K 3/20
(52) U.S. Cl. ...................... 525/233; 524/501; 526/338; 526/340
(58) Field of Search .................. 525/233; 526/338, 526/340; 524/501

(56) References Cited

U.S. PATENT DOCUMENTS

| | | | |
|---|---|---|---|
| 2,788,334 A | | 4/1957 | Bennett et al. |
| 3,222,334 A | | 12/1965 | Demme |
| 3,305,516 A | * | 2/1967 | Smith ......................... 524/521 |
| 3,468,833 A | | 9/1969 | Meincke |
| 3,573,246 A | | 3/1971 | Bennett |
| 4,433,094 A | * | 2/1984 | Ogawa et al. ............... 524/446 |
| 4,624,296 A | | 11/1986 | Takiguchi ............... 152/209 R |
| 4,632,958 A | | 12/1986 | Eshbach et al. ............ 524/574 |
| 5,221,714 A | | 6/1993 | Parker ........................ 525/237 |
| 5,225,479 A | | 7/1993 | Senyek et al. .............. 524/526 |
| 5,272,198 A | | 12/1993 | Kaminski et al. ........... 524/426 |
| 5,328,949 A | | 7/1994 | Sandstrom et al. ......... 524/262 |
| 5,336,730 A | | 8/1994 | Sandstrom et al. ...... 525/332.6 |
| 5,378,754 A | | 1/1995 | Bauer et al. ................ 524/514 |
| 5,395,891 A | * | 3/1995 | Obrecht et al. ............. 525/194 |

* cited by examiner

Primary Examiner—Patrick D. Niland
(74) Attorney, Agent, or Firm—Bruce J. Hendricks

(57) ABSTRACT

The present invention relates to a pneumatic tire having a tread containing from 50 to 100 phr of a dried rubber derived from a blend of a styrene butadiene latex and an acrylonitrile butadiene latex.

10 Claims, No Drawings

PNEUMATIC TIRE HAVING A TREAD COMPOUND DERIVED FROM LATEX BLEND

This is a continuation of application(s) Ser. No. 08/518,449, filed on Aug. 23, 1995" now abandoned.

BACKGROUND OF THE INVENTION

The present invention relates to a pneumatic tire having a tread which is composed of a unique blend of latices. The tread composition exhibits improved properties which correlate to increased durability and treadwear of the pneumatic tire.

SUMMARY OF THE INVENTION

The present invention relates to a pneumatic tire having a tread containing from 50 to 100 phr of a dried rubber derived from a blend of a styrene butadiene latex and an acrylonitrile butadiene latex.

DETAILED DESCRIPTION OF THE INVENTION

There is disclosed a pneumatic tire having a tread comprised of 100 parts by weight of a first blend of rubbers, wherein said first blend comprises (a) 50 to 100 phr of a dried rubber derived from a second blend of rubber latices, said second blend of rubber latices containing styrene-butadiene rubber latex and acrylonitrile-butadiene rubber latex and (b) 0 to 50 phr of a dried rubber selected from the group consisting of natural rubber, synthetic cis 1,4-polyisoprene, 3,4-polyisoprene, styrene/butadiene rubber, acrylonitrile/butadiene rubber, styrene/isoprene/butadiene terpolymer rubber, cis 1,4-polybutadiene rubber, high trans 1,4-polybutadiene rubber, styrene/isoprene rubber isoprene/butadiene rubber and mixtures thereof.

A majority (from 50 to 100 phr) of the total rubber used in the tread is a dried rubber derived from a blend of two rubber latices. The first latex is a latex derived from the emulsion polymerization of styrene and butadiene monomers. The bound styrene content of the styrene butadiene rubber latex may range from 5 to 50 percent by weight. For example, conventional styrene contents in commercially available SBR generally range from 20 to 28 percent and 30 to 45 percent. The relatively higher levels of styrene are considered beneficial for enhancing traction or skid resistance of the tire tread. The solids content, also known as percent solids, of the styrene butadiene latex may vary. For example, the percent solids may range from 5 to 70 percent. Preferably, the percent solids range from 10 to 40 percent.

The other latex which is combined with the styrene butadiene latex is an acrylonitrile butadiene latex, also known as an NBR latex. The bound acrylonitrile content may range as low as 5 percent to as high as 50 percent by weight. Preferably, the acrylonitrile level ranges from 10 to 35 percent. The solids content may range from 5 to 70 percent. Preferably, the percent solids range from 10 to 40 percent.

The SBR latex and the NBR latex are prepared in accordance with conventional emulsion polymerization techniques. The principles of emulsion polymerization are discussed in references such as "Synthetic Rubber" by G. S. Whitby, Editor-in-Chief, John Wiley and Sons, 1954, particularly Chapter 8, and "Emulsion Polymerization" by F. A. Bovey et al, Vol. IX of "High Polymers," Interscience Publishers, Inc., 1955.

Conventional free radical polymerization initiators that are used in emulsion polymerization include compounds such as t-butyl hydroperoxide, cumene hydroperoxide, diisopropylbenzene hydroperoxide and paramenthane hydroperoxides and even hydrogen peroxide. These compounds perform very effectively when used in polymerization recipes containing appropriate levels of supporting ingredients. By "supporting ingredients" is meant those materials often referred to as activators in emulsion, or other systems where required. U.S. Pat. No. 3,080,334 describes some of these materials at column 5, lines 20–26. Such materials can also be referred to as catalyst activators. The term "redox polymerization" is often used where the complete initiator system includes a redox system, i.e., reducing agents and oxidizing agents in a proportion that yields polymerization initiating species. All of these initiator systems are well known in the art.

Emulsion polymerizations are normally accomplished in the range of 5° C. to 90° C. Though the activator or "redox" initiated systems are preferred for low temperature polymerizations, they are very effective at high temperatures also, normally requiring appreciably lower quantities of the various ingredients to obtain a desirable polymerization rate.

The free radical sources used in the initiator systems are those customarily used in free radical polymerizations, for example, organic initiators such as azonitriles, azoderivatives, peroxides and hydroperoxides and inorganic initiators such as inorganic peroxy compounds. Radiation, e.g., of the ultraviolet and gamma ray type can also be used as a free radical source. Various organic initiators are described by J. Brandrup and E. H. Immergut, Polymer Handbook (John Wiley & Sons), 1965, pages II-3 to II-51. The pH of the latex emulsion generally ranges from about 7.5 to 13. Preferably, the pH ranges from about 8 to 11.

The SBR and NBR latices emulsion may also contain various conventional compounds such as surface active agents, short stop materials such as di-tertiary-butyl hydroquinone and similar compounds, all of which are present in small amounts. The surface active agents may consist of emulsifiers comprising the salts of natural acids such as potassium stearate, potassium-processed rosin, and the like, or such surface active agents may be synthetics such as alkali metal salts of alkyl aryl sulfonic acid, particularly alkylbenzene sulfonic acid, condensed naphthalene-formaldehyde sulfonic acid, and the like, or non-ionics such as polyalkylene oxide dioleates, sorbitan trioleate, alkylolamides, the condensation products of nonyl phenol with ethylene oxide or propylene oxide-ethylene oxide products. Preferably, anionic-type surfactants are used such as potassium stearate, potassium-processed rosin, and the alkali metal salts of alkylbenzene sulfonic acid.

The SBR latex and the NBR latex may be blended in a wide range of weight ratios, based on dry weight. For example, the blend of the two latices may comprise from 99 to 30 percent by weight of the styrene butadiene rubber and from 1 percent to 70 percent by weight of the NBR rubber. Preferably, the ratio will range from 95 to 35 percent by weight of the styrene butadiene rubber and from 5 to 65 percent by weight of the NBR rubber.

In addition to the SBR latex and NBR latex, additional latices may be optionally added to form the blend of latices prior to coagulation and drying. For example, natural rubber latex, polybutadiene latex and mixtures thereof may be used. Relative to the total dry weight of the SBR latex and NBR, these optional latices are added in minor amounts. For example, based on a dried weight basis, the amount of optional latex, if used, may be combined in an amount ranging from about 5 to 45 weight percent of the total weight of the SBR latex, NER latex and optional combined. Preferably, if an optional latex or latices are used, the amount ranges from 10 to 30 percent by weight based on the total weight of the SBR, NBR and optional latices combined. The solids content of the natural rubber latex and polybutadiene latex may range from about 10 to 60. Preferably, the solids content ranges from 15 to 50.

After the NBR and SBR latices have been combined and thoroughly mixed, along with any optional latex or latices, the blend of latices are coagulated to recover a dry rubber. Standard coagulation techniques, such as salt-acid coagulation procedures, can be employed.

The minority (from 0 phr to 50 phr) of the total rubber used in the tread is dried rubber(s) not derived from a blend of two or more latices. This rubber(s) may be natural rubber, synthetic cis 1,4-polyisoprene, 3,4-polyisoprene, solution polymerized or emulsion polymerized styrene/butadiene rubber, styrene/isoprene/butadiene terpolymer rubber, cis 1,4-polybutadiene, high trans 1,4-polybutadiene, styrene/isoprene rubber, isoprene/butadiene rubber and mixtures thereof. Preferably, if used, the dried rubber is natural rubber, cis-1,4-polybutadiene and mixtures thereof. The preferred amount of this component rubber is from 10 to 40 phr of the total rubber used in the tread with the balance of 90 to 60 phr being derived from the second blend of latices.

The term "phr" as used herein, and according to conventional practice, refers to "parts by weight of a respective material per 100 parts by weight of rubber or elastomer."

The pneumatic tire of the present invention may contain a siliceous filler. The siliceous fillers or pigments include pyrogenic and precipitated silica. The siliceous pigments are preferably precipitated silicas such as, for example, those obtained by the acidification of a soluble silicate, e.g., sodium silicate.

The silica filler, if used, may be added in amounts ranging from 10 to 250 phr. Preferably, the silica is present in an amount ranging from 15 to 80 phr.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

If silica is optionally added to the compound, one may add silica coupling agents to promote the adhesion between the rubber and silica. Representative coupling agents include organosilanes such as 3,3' bis(triethoxysilylpropyl) tetrasulfide. Silica coupling agents are generally used in amounts ranging from 0.1 to 20 phr. Specific examples of such organosilanes are disclosed in U.S. Pat. No. 4,128,438 incorporated by reference in its entirety.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, plasticizers, fillers, pigments, fatty acid, zinc oxide, waxes, antioxidants and antiozonants, peptizing agents and reinforcing materials such as, for example, carbon black. As known to those skilled in the art, depending on the particular properties of the tire tread, the additives mentioned above are selected and commonly used in conventional amounts.

Typical amounts of reinforcing type carbon blacks(s), range from 0 to 200 phr. Preferably, the carbon black level ranges from 5 to 125 phr. Representative of the conventional carbon blacks which may be used in the present invention include those known to those skilled in the art under the ASTM designations N110, N121, N205, N220, N231, N234, N242, N293, N299, S315, N326, N330, M332, N339, N343, N347, N351, N358 and N375. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The mixing of the rubber composition can be accomplished by methods known to those having skill in the rubber mixing art. For example the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more non-productive mix stages. The terms "non-productive" and "productive" mix stages are well known to those having skill in the rubber mixing art.

When large amounts of silica (over 20 phr) are used in conjunction with coupling agents, extended mix times significantly improve physical properties. Preferably, the mechanical mixing is under conditions sufficient to generate a rubber temperature between 130° C. and 180° C. for a period of time ranging from 10 seconds to 20 minutes.

The rubber compound as described herein is particularly suited for a tread of a pneumatic tire. Such tires can be built, shaped, molded and cured by various methods which are known and will be readily apparent to those having skill in such art. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained from the rubber stocks that were prepared. These properties include a torque minimum (Min. Torque), a torque maximum (Max. Torque), minutes to 90% of the torque increase (T90) and difference between the maximum torque and minimum torque (delta torque).

Shore Hardness was determined in accordance with ASTM D-1415.

While certain representative embodiments and details have been shown for the purpose of illustrating the invention, it will be apparent to those skilled in this art that various changes and modifications may be made therein without departing from the spirit or scope of the invention.

EXAMPLE 1

In this example, an 80/20 by weight E-SBR/NBR dried rubber compound derived from a latex blend of the two was evaluated in a highly reinforced silica compound against a (1) dried E-SBR, (2) a terpolymer derived from acrylonitrile, butadiene and styrene and (3) a 80/20 by weight E-SBR/NBR dried rubber compound mechanically mixed from dried SBR and dried NBR (same composition as latex blend). Rubber compounds containing the materials set out in Table I were prepared in a BR Banbury™ mixer. The nonproductive stage was mixed for an extended time—7 minutes once 160° C. temperature was achieved. The samples were cured at about 150° C. for about 18 minutes. Table I also illustrates the behavior and physical properties of the four cured samples.

TABLE I

Silica Compound Vulcanizate Properties

|  | Control Sample 1 | Control Sample 2 | Control Sample 3 | Sample 4 |
| --- | --- | --- | --- | --- |
| E-SBR[1] | 100 | — | — | — |
| ACN-SBR[2] Terpolymer | — | 100 | — | — |
| 80/20 E-SBR/NBR[3] Internal Mixer Blend | — | — | 100 | — |
| 80/20 E-SBR/NBR Latex Blend | — | — | — | 100 |
| Silica[4] | 70 | 70 | 70 | 70 |
| Coupling Agent[5] | 11.2 | 11.2 | 11.2 | 11.2 |
| Aromatic Oil | 37.5 | 37.5 | 37.5 | 37.5 |
| Stearic Acid | 3.0 | 3.0 | 3.0 | 3.0 |
| Wax | 1.5 | 1.5 | 1.5 | 1.5 |
| Antiozonant[6] | 2.0 | 2.0 | 2.0 | 2.0 |
| Antioxidant[7] | 1.0 | 1.0 | 1.0 | 1.0 |
| CBS[8] | 1.7 | 1.7 | 1.7 | 1.7 |
| DPG[9] | 2.0 | 2.0 | 2.0 | 2.0 |
| Sulfur | 1.4 | 1.4 | 1.4 | 1.4 |
| Zinc Oxide | 2.5 | 2.5 | 2.5 | 2.5 |
| Rheometer, 150° C. | | | | |
| ML (dNm) | 9.5 | 10.6 | 11.5 | 11.5 |
| MH (dNm) | 32.5 | 32.5 | 34.2 | 35.0 |
| Delta Torque (dNm) | 23.0 | 21.9 | 22.7 | 23.5 |
| T25 (min) | 7.6 | 7.7 | 6.7 | 6.3 |
| T90 (min) | 14.7 | 14.5 | 13.7 | 17.7 |

TABLE I-continued

Silica Compound Vulcanizate Properties

|  | Control Sample 1 | Control Sample 2 | Control Sample 3 | Sample 4 |
|---|---|---|---|---|
| Stress-Strain, 18 min/ 150° C. Modulus (MPa) | | | | |
| 100% | 1.65 | 1.63 | 1.73 | 1.66 |
| 300% | 8.83 | 8.80 | 9.05 | 9.13 |
| Brk Str (MPa) | 20.13 | 22.25 | 20.70 | 22.41 |
| EL-Brk (%) | 582 | 625 | 588 | 589 |
| Hardness (Room Temperature) | 56.5 | 57.0 | 58.6 | 58.2 |
| (100° C.) | 50.9 | 50.4 | 52.5 | 51.4 |
| Rebound (Room Temperature) | 27.9 | 25.9 | 29.3 | 28.4 |
| (100° C.) | 64.4 | 64.3 | 61.3 | 63.4 |
| DIN Abrasion, cc | 151 | 148 | 118 | 104 |
| Dynamic Mechanical Properties, 11 Hz | | | | |
| tan delta, 0° C. | 0.389 | 0.430 | 0.305 | 0.422 |
| tan delta, 60° C. | 0.112 | 0.117 | 0.112 | 0.119 |

[1] 40% by weight bound styrene, Tg = −32° C., ML1 + 4 (100° C.) = 103
[2] 3% by weight bound acrylonitrile, 40% bound styrene terpolymer made in accordance with U.S. Pat. No. 5,225,479
[3] The E-SBR had 40% by weight bound styrene, Tg = −32° C., ML1 + 4 (100° C.) = 103 and NBR was Chemigum ® N-926 which is commercially available from The Goodyear Tire & Rubber Company and having 15% by weight bound acrylonitrile, Tg = −54° C., ML1 + 4 (100° C.) = 42 (Latex blend is the same composition)
[4] Zeosil 1165MP commercially available from Rhone Poulene
[5] X50S, an organosilicon silica coupler, commercially available from Degussa (50% active Si69)
[6] Santoflex ® 13 commercially available from Monsanto
[7] Wingstay ® 100 commercially available from The Goodyear Tire & Rubber Company
[8] Santocure ® commercially available from Monsanto
[9] Diphenyl Guanidine commercially available from Monsanto The latex blend (Example 4) provides superior abrasion resistance (less volume loss) and ultimate break strength compared to all the control samples indicating improved tire tread wear properties and tire durability. The latex blend also provides a high tan delta at 0° C. indicating excellent wet traction and low tan delta at 60° C. indicating low rolling resistance. This unique compound containing E-SBR/NBR latex blend and silica reinforcement provides properties which indicate an excellent balance of tire traction, rolling resistance and wear that cannot be achieved using E-SBR, NBR or ACN-SBR terpolymer in silica or especially carbon black filled systems (Tables I, II and III).

EXAMPLE 2

In this example, an 80/20 by weight B-SBR/NBR dried rubber compound derived from a latex blend of the two was evaluated in a silica/carbon black reinforced compound against (1) a dried E-SBR and (2) a terpolymer derived from acrylonitrile, butadiene and styrene. Rubber compounds containing the materials set out in Table 2 were prepared in a BR Banburym mixer with extended nonproductive. The samples were cured at about 150° C. for about 18 minutes. Table II also illustrates the behavior and physical properties of the three cured samples.

TABLE II

Silica/Carbon Black Compound Vulcanizate Properties

|  | Control Sample 1 | Control Sample 2 | Sample 3 |
|---|---|---|---|
| E-SBR[1] | 100 | — | — |
| ACN-SBR[2] | — | 100 | — |
| 80/20 E-SBR/NBR Latex Blend | — | — | 100 |
| Silica[3] | 40 | 40 | 40 |
| Carbon Black[4] | 40 | 40 | 40 |
| Coupling Agent[5] | 6.4 | 6.4 | 6.4 |
| Aromatic Oil | 37.5 | 37.5 | 37.5 |
| Stearic Acid | 2.0 | 2.0 | 2.0 |
| Wax | 1.5 | 1.5 | 1.5 |
| Antiozonant[6] | 2.0 | 2.0 | 2.0 |
| Antioxidant[7] | 1.0 | 1.0 | 1.0 |
| CBS[8] | 1.5 | 1.5 | 1.5 |
| DPG[9] | 1.0 | 1.0 | 1.0 |
| Sulfur | 1.4 | 1.4 | 1.4 |
| Zinc Oxide | 2.5 | 2.5 | 2.5 |
| Rheometer, 150° C. | | | |
| ML (dNm) | 9.0 | 9.0 | 12.9 |
| MH (dNm) | 30.5 | 29.8 | 34.5 |
| Delta Torque (dNm) | 20.5 | 20.8 | 21.6 |
| T25 (min) | 6.7 | 6.0 | 5.2 |
| T90 (min) | 16.0 | 14.5 | 19.5 |
| Stress-Strain, 18 min/150° C. Modulus (MPa) | | | |
| 100% | 1.74 | 1.71 | 1.91 |
| 300% | 9.10 | 8.41 | 9.25 |
| Brk Str (MPa) | 19.91 | 19.88 | 20.81 |
| EL-Brk (%) | 582 | 613 | 601 |
| Hardness (Room Temperature) | 61.8 | 61.6 | 63.8 |
| (100° C.) | 51.0 | 50.0 | 53.4 |
| Rebound (Room Temperature) | 21.6 | 20.2 | 22.9 |
| (100° C.) | 50.9 | 49.4 | 48.5 |
| DIN Abrasion, cc | 154 | 157 | 142 |
| tan delta, 11 Hz | | | |
| 0° C. | 0.267 | 0.287 | 0.253 |
| 60° C. | 0.14i | 0.157 | 0.148 |

[1] 40% by weight bound styrene, Tg = −32° C., ML1 + 4 (100° C.) = 103
[2] 3% by weight bound acrylonitrile, 40% bound styrene terpolymer made in accordance with U.S. Pat. No. 5,225,479
[3] Zeosil ™ 1165MP commercially available from Rhone Poulene
[4] N205 from Cabot
[5] X50S, an organosilicon silica coupler, commercially available from Degussa (50% by weight deposited on carbon black carrier active Si69)
[6] Santoflex ® 13 commercially available from Monsanto
[7] Wingstay ® 100 commercially available from The Goodyear Tire & Rubber Company
[8] Santocure ™ commercially available from Monsanto
[9] Diphenyl Guanidine commercially available from Monsanto The latex blend provides superior abrasion resistance, modulus and ultimate break strength compared to the terpolymer and E-SBR indicating improved tire wear and durability. Also, higher hardness and modulus values for the latex blend indicate potentially improved tire handling. Tangent delta and rebound values indicate good rolling resistance and wet traction properties relative to the controls.

TABLE III

Carbon Black Compound Vulcanizate Properties

|  | Control Sample 1 | Control Sample 2 | Sample 3 |
|---|---|---|---|
| E-SBR[1] | 70 | — | — |
| ACN-SBR[2] | — | 70 | — |
| 80/20 E-SBR/NBR Latex Blend | — | — | 70 |
| BR cis PBD[3] | 30 | 30 | 30 |
| Carbon Black[4] | 70 | 70 | 70 |

TABLE III-continued

Carbon Black Compound Vulcanizate Properties

|  | Control Sample 1 | Control Sample 2 | Sample 3 |
|---|---|---|---|
| Aromatic Oil | 44 | 44 | 44 |
| Stearic Acid | 2.0 | 2.0 | 2.0 |
| Wax | 4.0 | 4.0 | 4.0 |
| Zinc Oxide | 2.0 | 2.0 | 2.0 |
| Antidegradant[5] | 1.2 | 1.2 | 1.2 |
| CBS[6] | 1.0 | 1.0 | 1.0 |
| TMTD[7] | 0.3 | 0.3 | 0.3 |
| Sulfur | 1.5 | 1.5 | 1.5 |
| Rheometer, 150° C. | | | |
| ML (dNm) | 6.5 | 6.2 | 8.0 |
| MH (dNm) | 28.6 | 28.9 | 29.5 |
| ts1 (min) | 6.8 | 6.3 | 6.4 |
| T25 (min) | 8.8 | 8.1 | 7.9 |
| T90 (min) | 16.0 | 15.0 | 15.5 |
| Stress-Strain, 18 min/150° C. | | | |
| Modulus (MPa) | | | |
| 100% | 1.28 | 1.43 | 1.41 |
| 300% | 4.68 | 5.42 | 5.33 |
| Brk Str (MPa) | 16.32 | 16.56 | 16.63 |
| EL-Brk (%) | 755 | 718 | 724 |
| Hardness (Room Temperature) | 58.0 | 61.1 | 59.6 |
| (100° C.) | 46.2 | 47.2 | 48.3 |
| Rebound (Room Temperature) | 23.7 | 22.3 | 24.6 |
| (100° C.) | 45.2 | 44.4 | 45.6 |
| DIN Abrasion, cc | 156 | 143 | 134 |
| tan delta, 11 Hz | | | |
| 0° C. | 0.198 | 0.209 | 0.187 |
| 60° C. | 0.166 | 0.185 | 0.155 |

[1] 40% by weight bound styrene, Tg = −32° C., ML1 + 4 (100° C.) = 103
[2] 3% by weight bound acrylonitrile, 40% bound styrene terpolymer made in accordance with U.S. Pat. No. 5,225,479
[3] cis-polybutadiene commercially available from the Goodyear Tire & Rubber Company under the designation Budene ® 1254
[4] N205 from Cabot
[5] Wingstay ® 100 commercially available from The Goodyear Tire & Rubber Company
[6] Santocure commercially available from Monsanto
[7] Tetramethy thiuram disulfide As in the other formulations, the latex blend provides superior abrasion resistance, tensile strength and rebound compared to the controls indicate improved tread wear, durability and rolling resistance.

What is claimed is:

1. A pneumatic tire having a tread comprised of 100 parts by weight of a first blend of rubbers, wherein said first blend comprises
   (a) 50 to 100 phr of a dried rubber derived from a second blend of rubber latices, said second blend of rubber latex containing styrene-butadiene rubber latex and acrylonitrile-butadiene rubber latex and
   (b) 0 to 50 phr of a dried rubber selected from the group consisting of natural rubber, synthetic cis 1,4-polyisoprene, 3,4-polyisoprene, styrene/butadiene rubber, acrylonitrile/butadiene rubber, styrene/isoprene/butadiene terpolymer rubber, cis 1,4-polybutadiene rubber, high trans 1,4-polybutadiene rubber, styrene/isoprene rubber isoprene/butadiene rubber and mixtures thereof.

2. The pneumatic tire of claim 1 wherein in the tread said second blend of rubber latices comprises, based on dry weight,
   (a) from 99 to 30 percent by weight of styrene butadiene rubber and
   (b) from 1 percent to 70 percent by weight of acrylonitrile butadiene rubber.

3. The pneumatic tire of claim 1 wherein in the tread said first blend comprises
   (a) 60 to 90 phr of a dried rubber derived from said second blend of rubber latices and
   (b) 40 to 10 phr of a dried rubber selected from the group consisting of natural rubber, synthetic cis 1,4-polyisoprene, 3,4-polyisoprene, styrene/butadiene rubber, acrylonitrile/butadiene rubber, styrene/isoprene/butadiene terpolymer rubber, cis 1,4-polybutadiene rubber, high trans 1,4-polybutadiene rubber, styrene/isoprene rubber isoprene/butadiene rubber and mixtures thereof.

4. The pneumatic tire of claim 1 wherein in the tread said second blend of rubber latices additionally comprises an optional latex selected from the group consisting of natural rubber latex, polybutadiene latex and mixtures thereof.

5. The pneumatic tire of claim 4 wherein, based on a dried weight basis, the amount of natural rubber latex, polybutadiene latex and mixtures thereof ranges from 5 to 45 weight percent of the total weight of the styreneb rubber latex, acrylonitrile-butadiene rubber latex and optional latex combined.

6. The pneumatic tire of claim 1 wherein said first blend of rubber additionally comprises from 10 to 250 phr of particulate silica.

7. The pneumatic tire of claim 1 wherein said tread, the styrene butadiene rubber latex used in the second blend has a bound styrene content in the range of from 5 to 50 percent by weight.

8. The pneumatic tire of claim 1 wherein in said tread said acrylonitrile butadiene rubber latex used in the second blend has as bound acrylonitrile content in the range of from 5 to 50 percent by weight.

9. The pneumatic tire of claim 6 wherein in said tread the silica is characterized by having a BET surface area in a range of from 40 to 600 square meters per gram and a dibutylphthalate (DBP) absorption value in a range of from 100 to 400.

10. The pneumatic tire of claim 6 wherein said first blend of rubber is mechanically mixed under conditions sufficient to generate a rubber temperature between 130° C. and 180° C. for a period of time ranging from 10 seconds to 20 minutes.

* * * * *

UNITED STATES PATENT AND TRADEMARK OFFICE
CERTIFICATE OF CORRECTION

PATENT NO.   : 6,346,579 B1
DATED         : February 12, 2002
INVENTOR(S)  : David John Zanzig et al.

It is certified that error appears in the above-identified patent and that said Letters Patent is hereby corrected as shown below:

Column 3,
Line 4, change "NER" to -- NBR --;

Column 7,
Line 14, change "hardnees" to -- hardness --;

Column 8,
Line 37, change "0.14i" to -- 0.141 --;

Column 9,
Line 25, change "hardnees" to -- hardness --;

Column 10,
Line 3, change "styrene/isoprene rubber isoprene/butadiene" to -- styrene/isoprene rubber, isoprene/butadiene --;
Line 23, change "styrene/isoprene rubber isoprene/butadiene" to -- styrene/isoprene rubber, isoprene/butadiene --; and
Line 32, change "styreneb" to -- styrene-butadiene --.

Signed and Sealed this

Tenth Day of September, 2002

*Attest:*

*Attesting Officer*

JAMES E. ROGAN
*Director of the United States Patent and Trademark Office*